United States Patent [19]

Miller

[11] Patent Number: 5,863,341
[45] Date of Patent: Jan. 26, 1999

[54] METHOD OF PREPARING A STARCH ADHESIVE AND PRODUCTS OF THE METHOD

[76] Inventor: Ray Ramsay Miller, 3614 48th St. Court NW., Gig Harbor, Wash. 98335

[21] Appl. No.: 90,349

[22] Filed: Jun. 4, 1998

Related U.S. Application Data

[60] Division of Ser. No. 715,124, Sep. 17, 1996, which is a continuation-in-part of Ser. No. 574,270, Dec. 18, 1995, Pat. No. 5,609,711, which is a continuation-in-part of Ser. No. 444,936, May 19, 1995, abandoned, which is a continuation-in-part of Ser. No. 263,360, Jun. 21, 1994, abandoned.

[51] Int. Cl.$^6$ ............................ C09J 103/02; C08L 3/02; C09D 103/02
[52] U.S. Cl. ............................. 127/29; 127/32; 127/71; 106/206.1
[58] Field of Search .......................... 127/29, 32, 71; 106/206.1

[56] References Cited

U.S. PATENT DOCUMENTS

| | | | |
|---|---|---|---|
| 3,101,284 | 8/1963 | Etheridge | 127/69 |
| 3,133,836 | 5/1964 | Winfrey et al. | 127/71 |
| 3,374,115 | 3/1968 | Frank et al. | 127/29 |
| 3,424,613 | 1/1969 | Huber et al. | 127/28 |
| 3,607,394 | 9/1971 | Geronimo et al. | 127/32 |
| 3,630,775 | 12/1971 | Winkler | 127/71 |
| 3,876,467 | 4/1975 | McCombs et al. | 127/71 |
| 4,230,503 | 10/1980 | Hughes | 127/1 |
| 4,329,181 | 5/1982 | Chiu et al. | 106/213 |
| 4,469,524 | 9/1984 | Assarson | 127/1 |
| 4,673,438 | 6/1987 | Wittwer et al. | 106/126 |
| 4,787,937 | 11/1988 | Leake | 106/213 |
| 5,181,959 | 1/1993 | Nagai et al. | 106/211 |

OTHER PUBLICATIONS

Report of Cold Set Adhesive Project published by St Lawrence Reactors, Ltd., St. Lawrence Technologies, Bruce Energy Center, RR 3, Tiverton, Ontario No date avail.

*Primary Examiner*—David Brunsman
*Attorney, Agent, or Firm*—Keith D. Gehr

[57] ABSTRACT

A method of preparing a starch adhesive ready for use in which a starch bearing, compound is fed to a pressurized system in which the starch is heated, melted, cooled and removed from the pressurized system to comprise an adhesive ready for use. The temperature of the product is maintained above 40° C. to prevent irreversible viscosity increase due to system hysteresis. The adhesive product is especially useful for use in manufacturing corrugated paperboard.

5 Claims, 7 Drawing Sheets

PREPARATION SYSTEM FOR A STARCH ADHESIVE PRODUCT
FEED UNGELATINIZED STARCH
PRESSURIZE, HEAT AND GELATINIZE
MELT THE STARCH GEL
COOL THE STARCH AND
REMOVE FROM PRESSURE ZONE
PRODUCT: A STARCH ADHESIVE
READY FOR USE
*Fig. 2*

Fig. 4  CONTINUOUS REACTOR OPTION

BATCH REACTOR OPTION

METHOD OF PREPARING A STARCH ADHESIVE AND PRODUCTS OF THE METHOD

This application is a division of application Ser. No. 08/715,124, filed Sept. 17, 1996, which is a continuation-in-part of application Ser. No. 574,270, filed Dec. 18, 1995, now U.S. Pat. No. 5,609,711, which is a continuation-in-part of application Ser. No. 444,936, filed May 19, 1995 and now abandoned, which was a continuation-in-part of application Ser. No. 263,360, filed Jun. 21, 1994 and now abandoned.

BACKGROUND OF THE INVENTION

Starch is the commonly used adhesive for making corrugated paperboard. The common means of application of the starch adhesive is to apply the starch at about 28% solids with a glue roll, by rotating the roll in a pond of adhesive to convey the adhesive to the flute tips of the corrugating medium, to adhere the liner face sheet or sheets to the medium. A so called "carrier" portion of about 20% of the starch is gelatinized (cooked) to hold the raw starch in suspension for handling and application. An equivalent alternative approach is the "no carrier" method in which all the starch is partially gelatinized to accomplish essentially the same purposes as the carrier system.

In the parent application to the present one, U.S. patent application Ser. No. 08/574,270, I describe an adhesive system for corrugated board involving providing an essentially ungelatinized starch suspension which is significantly gelatinized in the application device before application by extrusion onto the medium.

SUMMARY OF THE INVENTION

The present invention incorporates a process of melting and cooling a starch suspension in water under pressure to reduce the viscosity of gelatinized starch in order to provide a starch adhesive of relatively high solids, high initial tack, and moderate viscosity. This process is possible because of the hysteresis inherent in the temperature/viscosity curve for starch as it is heated, melted, and cooled under pressure, as described in my above mentioned application for U.S. patent Ser. No. 08/574,270, which is herein incorporated by reference.

Because of the viscosity reduction and tack increase, the starch adhesive is made more useful when used for making corrugated paperboard, and the process provides an adhesive also applicable to other applications, such as replacement of hot melt adhesives or cold glues (PVA, etc.) in industrial applications such as carton sealing and paper laminating. The reduced viscosity of the starch adhesive makes it easier to apply by known application technologies including glue roll, extrusion or flooded nip.

It is an object of the invention to provide a low cost adhesive to join water wettable, absorbent materials such as paper, wood and the like.

It is an another object to provide an adhesive with moderate viscosity and with good initial tack, as applied.

It is a further object to provide a starch adhesive which is fully gelatinized before application, but which has decreased viscosity and increased tack, at a given application temperature, compared to those characteristics when first gelatinized and heated to that temperature.

It is an additional object to provide a starch adhesive which has been prepared by melting and cooling a starch suspension, so that the resulting composition may be used as an adhesive as so prepared, or may be further modified by mixing with other materials, including ungelatinized starch.

It is yet an object to provide a starch adhesive which can be utilized to improve the effectiveness of the manufacture of corrugated paperboard and similar manufacturing processes.

BRIEF DESCRIPTION OF THE DRAWINGS

FIG. 2 is a block diagram showing the basic steps involved in the process of the present invention.

DETAILED DESCRIPTION OF THE PREFERRED EMBODIMENTS

Figure 1:
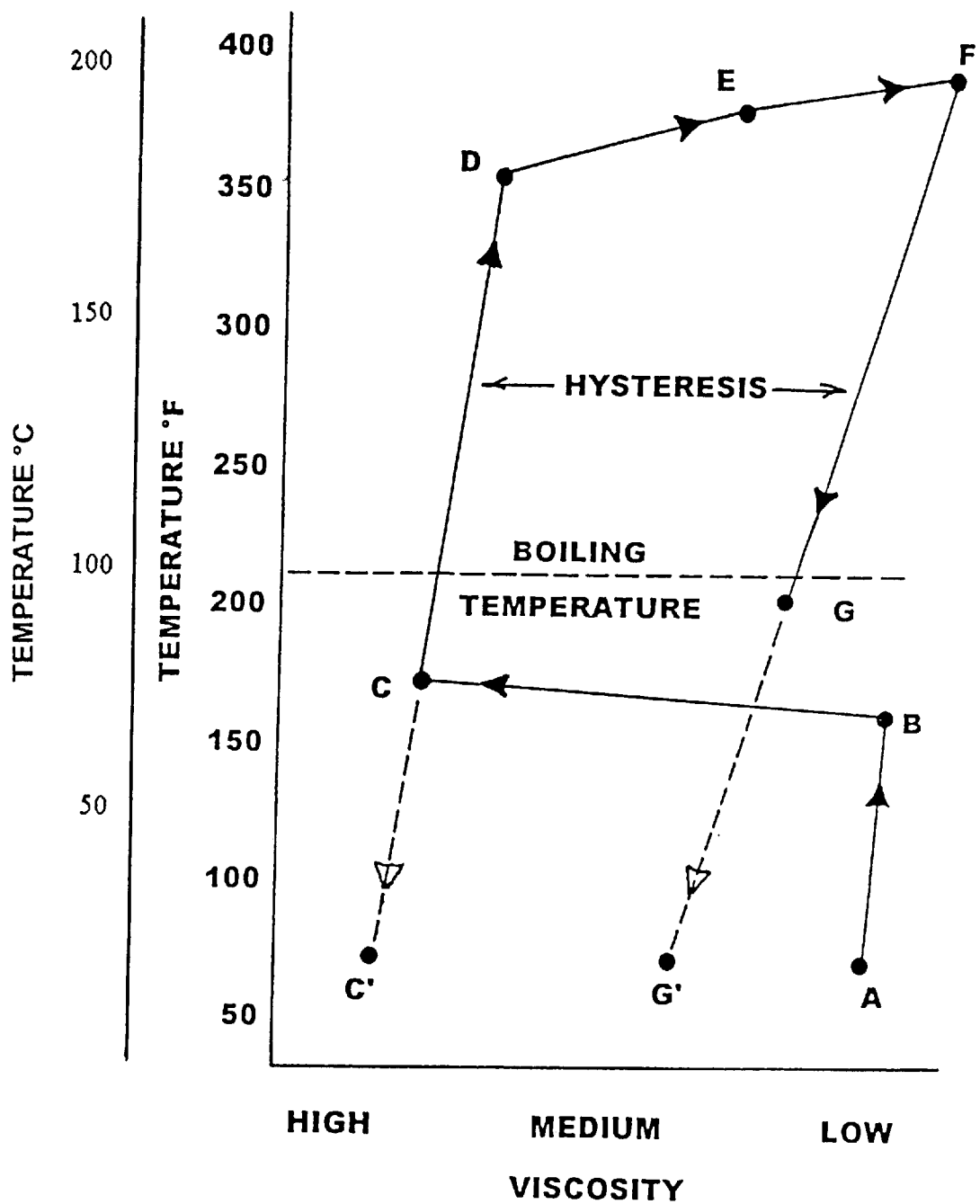
FIG. 1 shows a generalized temperature/viscosity curve for heating and cooling a starch suspension.

FIG. 1 shows a graphical representation of a typical viscosity/temperature relationship for a starch bearing composition undergoing a heating cooling cycle within a pressurized processing device, or system. The estimates of viscosity and other conditions refer to tests on a 50% solids composition of a corn starch. Other starch types and compositions will vary somewhat from those of this example. For example, a 50% solids composition of commercial corn flour will have higher viscosities at all temperatures.

The pressurized container used for the following described tests included a transparent glass tube allowing observation and permitting visual judgments of the properties studied.

Referring to FIG. 1, the temperature rise from Point A to Point B represents the initial heating of the ungelatinized suspension of starch in water. There is only a very slight decrease in viscosity with temperature, as is typical of aqueous suspensions.

Increasing the temperature slightly from Point B to Point C shows the dramatic increase in viscosity as the starch suspension is heated to the gelatinization temperature and is gelatinized to a stiff gel. At this point it has a viscosity somewhat similar to that of a commercial petroleum jelly at room temperature. A bead of gel extruded at Point C will readily hold its shape and will dry in that form unless forcibly reshaped. If the gel at Point C is cooled to Point C' at ambient temperature the basic nature of the gel is unchanged.

Increasing the temperature from Point C to Point D shows the gradual decrease in viscosity with temperature of the starch gel. At Point D a distinct softening occurs.

The relatively small increase in temperature from Point D to Points E and F causes the composition to become very fluid. At that point it has a viscosity approximating that of a light weight SAE 10 motor oil.

As the composition is cooled from Point F to Point G the viscosity change (increase) is much lower than the incremental change (decrease) during the heating cycle. This hysteresis enables the extrusion or other application of adhesive at Point G with the desired reduced viscosity, increased tack, and absence of puffing which would otherwise have been caused by the flashing of water in the composition upon extrusion at higher temperatures. The reduced rate of incremental viscosity increase from Point F prevails all the way to ambient temperature at Point G'.

Preferably, the composition is cooled to a temperature of 150° C. or below before use. Most preferably, it will be cooled to a temperature near or below 100° C. For most uses the preferred application temperature will be about 90° C. to 100° C. where the viscosity will be near or in the minimum range.

The adhesives of the invention can advantageously be used for the manufacture of corrugated paperboard. They can be applied by a typical glue spreader, in which an applicator roll revolves in a pond of adhesive and prints the adhesive composition on the tips of the fluted corrugating medium prior to combining with a liner sheet. They can also be applied from an extruder or by other means as is shown in my application Ser. No. 574,270. A particular advantage of the present adhesive so used is the ability to apply it at higher solids content because of the reduced viscosity. Stated differently, a higher solids adhesive has a lower moisture content which enables drying time and, potentially, sheet warpage to be reduced.

FIG. 2 is a block diagram presenting the basic steps involved in the process of the present invention. A starch suspension in water is fed into a pressurized system in which the starch is heated, melted, then cooled. The physically altered composition is then removed from the pressure zone and comprises an adhesive ready for use, or for further compounding. The process may be practiced by different configurations of known equipment, including those described below. Also detailed steps, not shown, can be utilized to conserve energy consumption in the process, or otherwise improve the effectiveness of the process. Gelatinized starch can be processed as shown, but it will normally be preferred that the feed be an essentially ungelatinized starch composition. Essentially any formulation of starch, from any starch source, can be used in the process. Normal corn starch is preferred in many instances because of its low cost and good availability, but other starches can be utilized for their economy or to alter the characteristics of the product adhesive. The process is highly amenable to the use of known additives of many types such as inert additives for economy, plasticizers, tackifiers, additives for water resistance or water solubility, and the like. The process is usable over a very broad range of starch solids, covering at least the range of 20% to 80% starch solids. Further, it is quite easy to adjust the solids level up or down within the process. In order to contain water vapor pressures at the temperatures described in FIG. 1, system pressures of 250 to 300 psi (17 to 20 bars) are required. In the process, the final cooling step is operated to end at the desired temperature for use of the adhesive product as is, the viscosity and tack at that temperature having been adjusted by the process parameters as described in FIG. 1. Cooling below that temperature and reheating will involve some redundant hysteresis in the viscosity/temperature relationship. The product can also be further compounded in any way desired, such as mixing with another adhesive, or mixing with gelatinized or ungelatinized starch. When the added composition is an ungelatinized starch, the melted and cooled starch would be cooled to a range of 40 to 60 degrees C. as appropriate to get below the gelatinization temperature of a typical modified corn starch, and to a range of 55 to 70 degrees C. to get below the gelatinization temperature of an unmodified corn starch which typically has a gelatinization temperature of about 74 degrees C.

Figure 3:
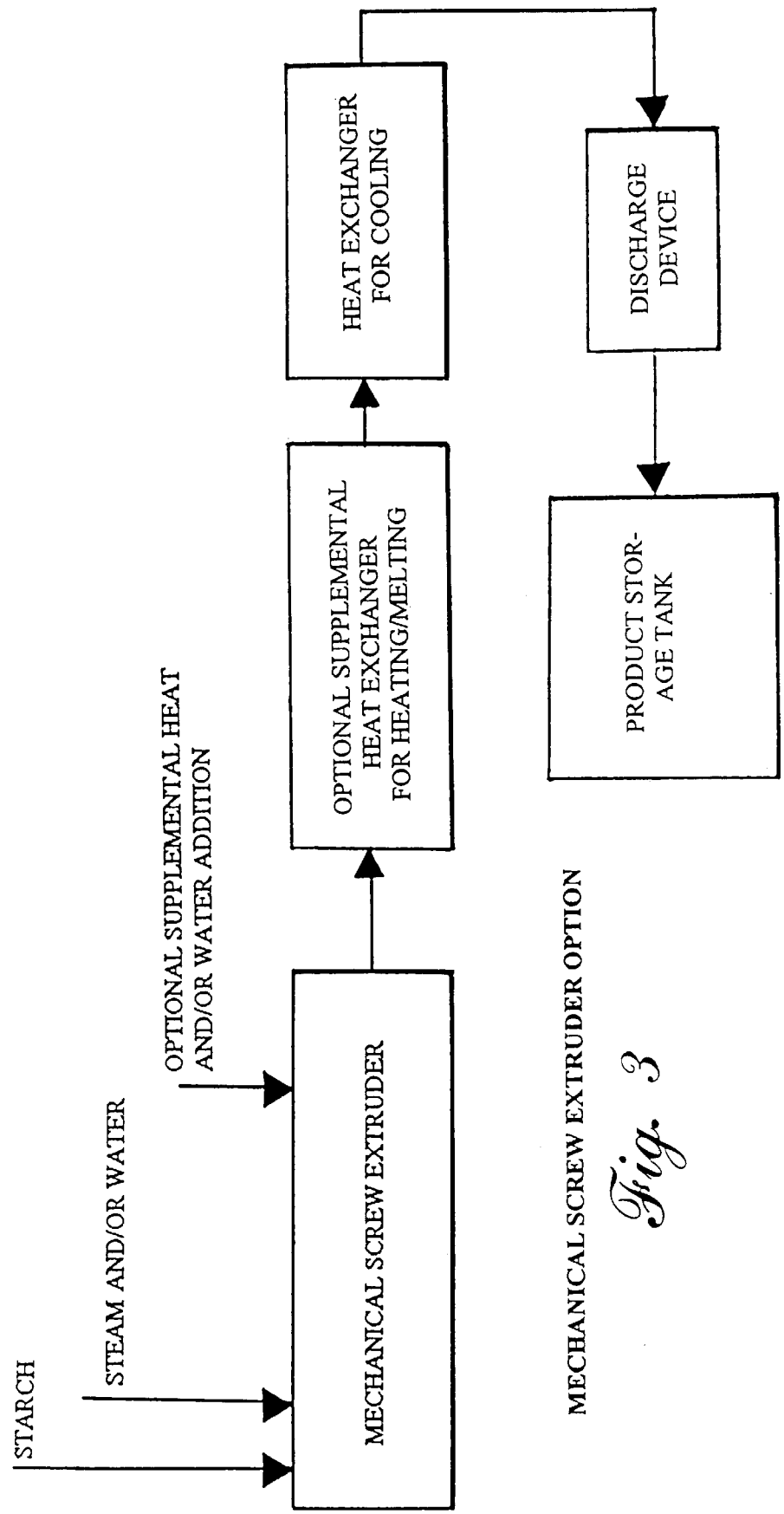
FIG. 3 is a schematic block diagram of alternative set of equipment for practicing the present invention, utilizing a mechanical screw extruder.

FIG. 3 illustrates the use of a mechanical screw extruder to operate the process. This is especially applicable in the higher ranges of solids, say above 55% solids. Both single screw and twin screw extruders are widely used for starch processing. Supplemental heating and subsequent cooling can be added internal to the extruder or external as desired. A discharging device is required, which can be, for instance, a back pressure control valve, or a rotary discharger device of known design.

Figure 4:
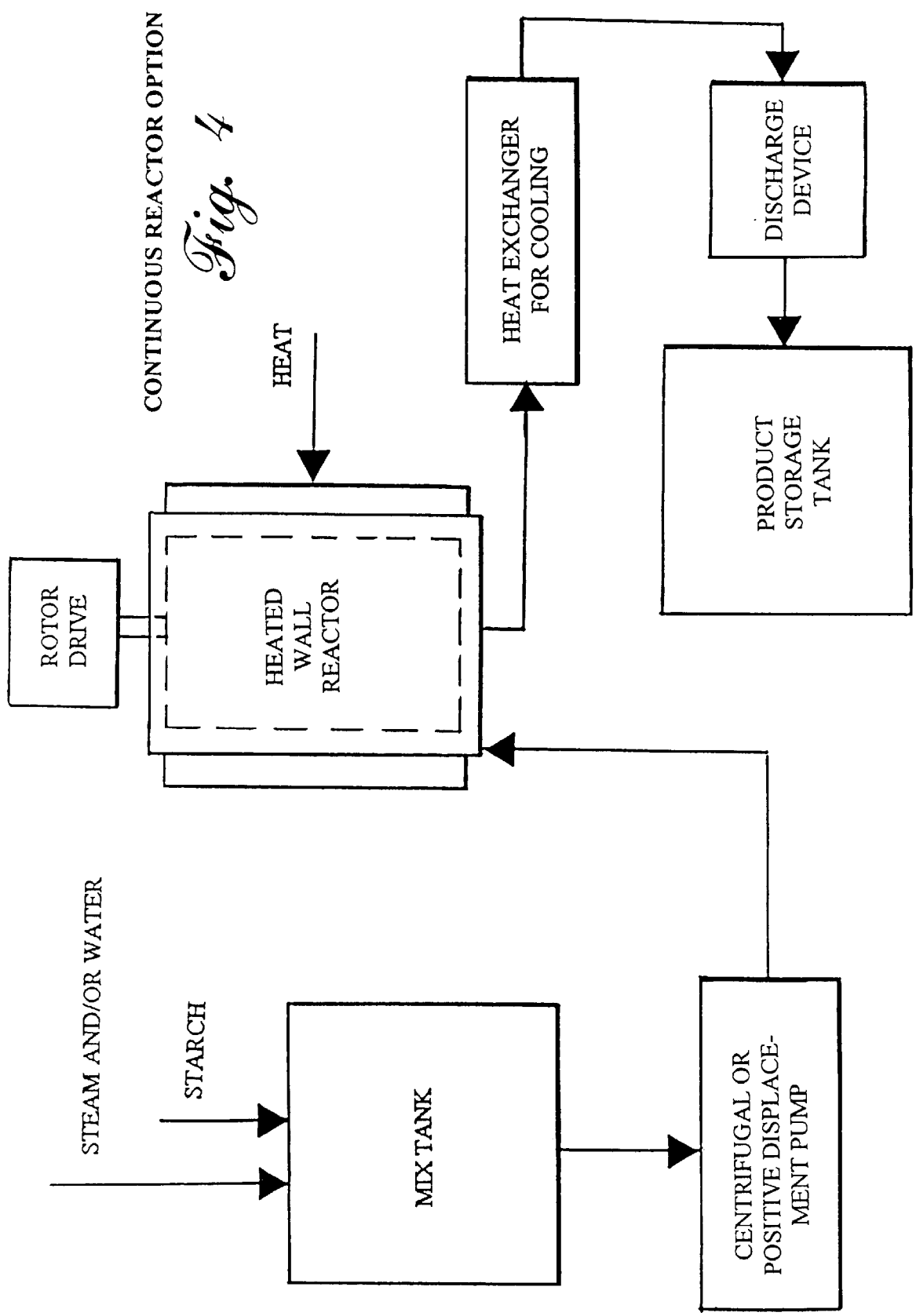
FIG. 4 shows a schematic block diagram of a second alternative set of equipment for the process, utilizing a continuous reactor.

FIG. 4 illustrates the use of pumped starch feed to a continuous heating/melting reactor. The basic principles of the reactor are known but it would be fitted with an internal rotor which would cause significant recirculation of the molten starch, and ensure good heat transfer between the heated reactor wall and the mixture of recirculating molten starch and the makeup starch feed stream. A product stream would be taken off in the zone of fully melted starch and cooled as desired in heat exchanger equipment. This equipment configuration would be used at lower solids levels, below about 50% solids, to enable the pumping of the starch suspension.

Figure 5:
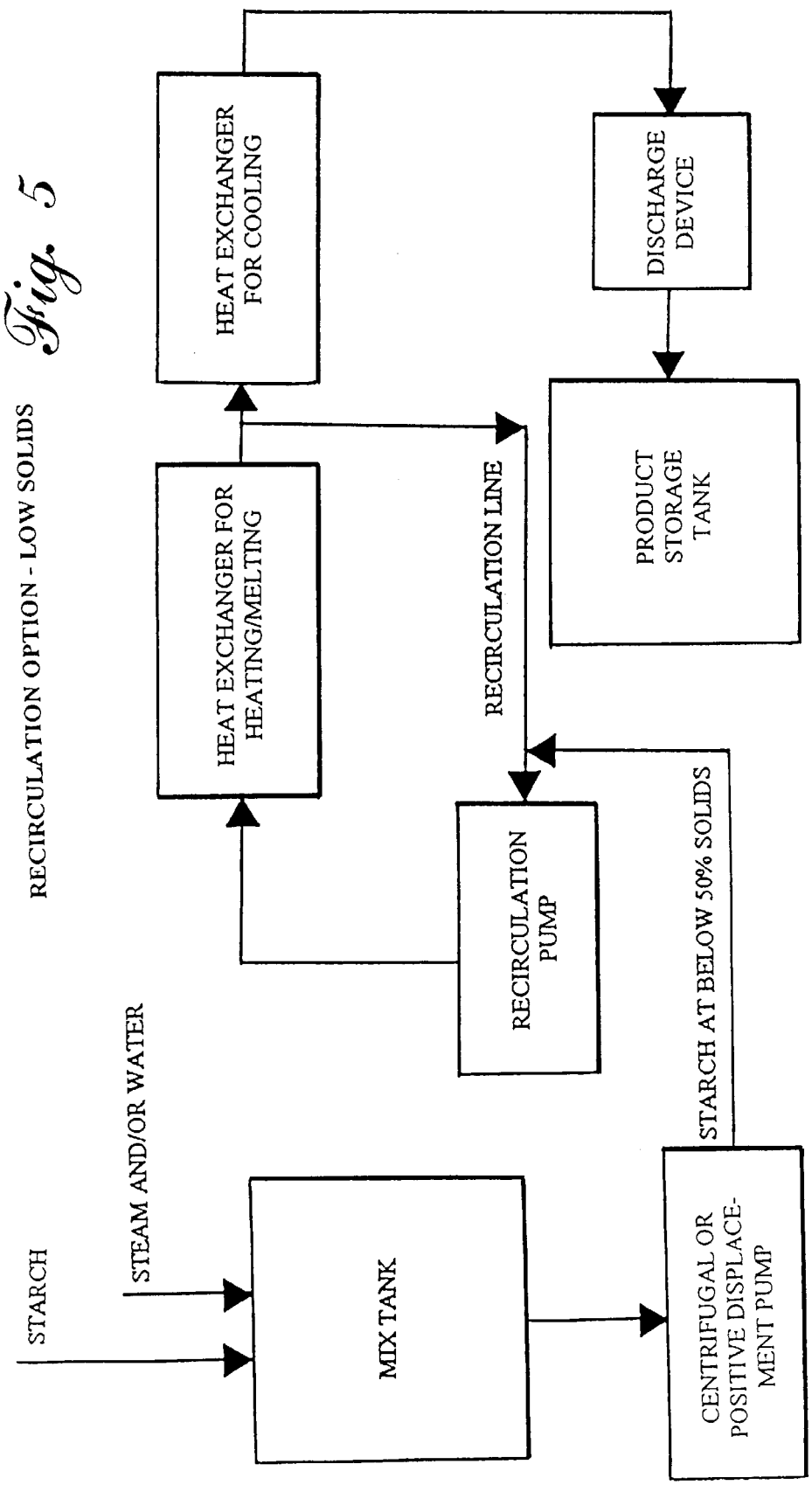
FIG. 5 shows a diagram of a third alternative set of equipment using pumped recirculation.

FIG. 5 illustrates the use of known pumping and heat exchanger technology to operate in a manner very similar to the recirculating reactor of FIG. 4. This alternative also is applicable to the solids range below 50% solids.

Figure 6:
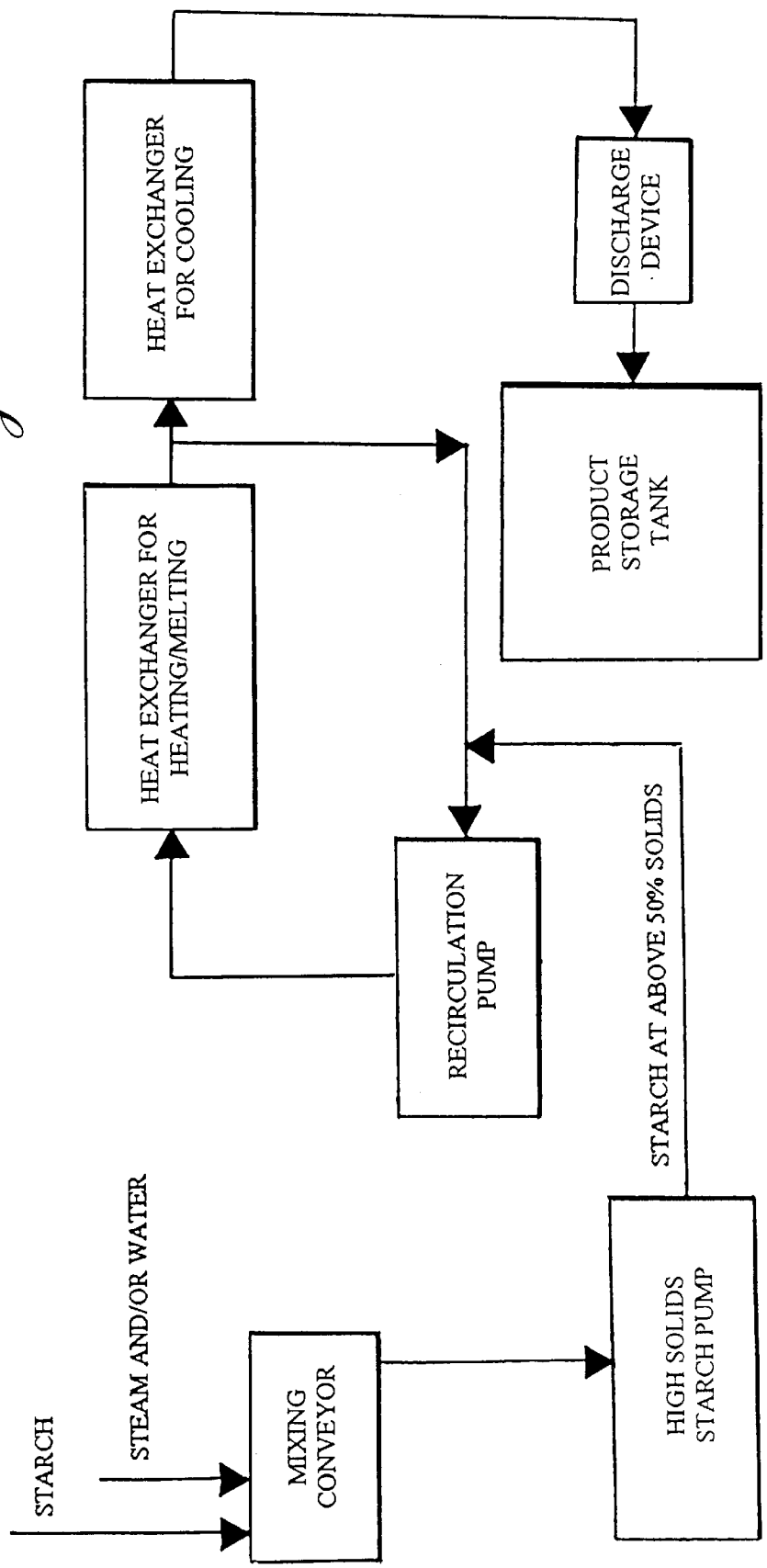
FIG. 6 shows a diagram of a fourth alternative equipment set using a high solids starch pump.

FIG. 6 shows the general configuration of the recirculation option of FIG. 5 except using a more specialized pump to enable feeding starch at solids levels above 50%. This is a very demanding pumping application requiring a special pump such as a plunger type pump or a twin screw pump for these higher starch solids levels.

Figure 7:
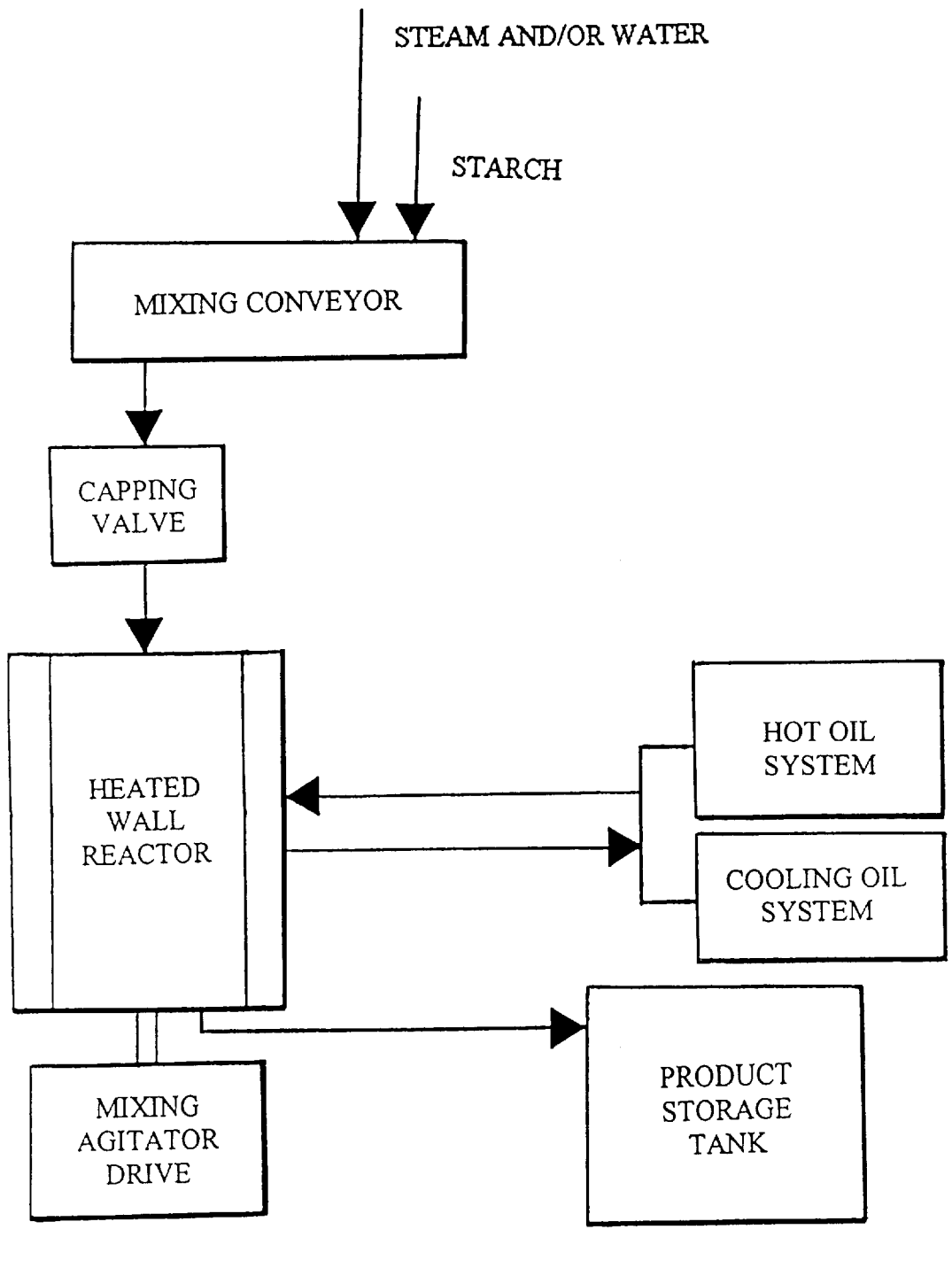
FIG. 7 shows a diagram of an alternative equipment set using, a batch reactor.

FIG. 7 shows the use of a batch operated reactor, in which a capping valve is opened for charging the starch to the reactor at any solids level desired, from the lowest to the highest. After charging the reactor with starch, the capping valve is closed for heating, melting and cooling the starch under pressure in the reactor. The completed product is transferred to a storage tank.

It will be evident to those skilled in the art that many variations can be made in the process which are not herein described in detail. These variations should be considered to be within the scope of the invention if within the encompass of the appended claims.

I claim:

1. A method of preparing an adhesive comprising:

supplying a starch bearing composition to a preparation system and placing the composition under pressure;

heating the starch bearing composition while under pressure at least to the melting point of the composition; then cooling the composition while still under pressure to a temperature below about 150° C. but not below about 100° C. to provide an adhesive ready for use or further compounding.

2. The method of claim 1 in which the starch bearing composition is further cooled to a temperature below about 100° C. but not below about 40° C. and removing the composition from the pressure zone of the system to provide an adhesive ready for use or further compounding.

3. The method of claim 2 further comprising adding ungelatinized starch to the melted and cooled starch composition while maintaining the compounded mixture above a temperature of about 40° C. to provide an adhesive ready for use.

4. The method of claim 1 in which the starch bearing composition is comprised of essentially ungelatinized starch.

5. A product made by the method of claim 1.

* * * * *